W. B. MOSES.
IGNITION APPARATUS.
APPLICATION FILED MAR. 12, 1920.

1,395,590.

Patented Nov. 1, 1921.
4 SHEETS—SHEET 1.

W. B. MOSES.
IGNITION APPARATUS.
APPLICATION FILED MAR. 12, 1920.

1,395,590.

Patented Nov. 1, 1921.
4 SHEETS—SHEET 4.

Inventor
W. B. Moses
by Jesse A. Holton
atty.

UNITED STATES PATENT OFFICE.

WILLIAM B. MOSES, OF WATERTOWN, MASSACHUSETTS, ASSIGNOR TO GRAY & DAVIS INC., OF CAMBRIDGE, MASSACHUSETTS.

IGNITION APPARATUS.

1,395,590.  Specification of Letters Patent.  Patented Nov. 1, 1921.

Application filed March 12, 1920. Serial No. 365,230.

*To all whom it may concern:*

Be it known that I, WILLIAM B. MOSES, a citizen of the United States, residing at Watertown, in the county of Middlesex and State of Massachusetts, have invented certain new and useful Improvements in Ignition Apparatus, of which the following is a full, clear, and exact description.

This invention relates to Ignition Apparatus and with regard to certain more specific features thereof to adapter means whereby battery ignition may be provided in connection with an internal combustion engine originally designed for another type of ignition.

The invention has for one of its important objects to provide means interchangeable with original or standard parts of the electrical system related to an internal combustion engine whereby the storage battery of the system may be quickly and easily adapted to supply current for the ignition of the engine.

Another object of the invention is to provide battery ignition adapter means of simple, inexpensive and compact character.

Another object of the invention lies in the provision of means for effecting variations in the timing of the ignition sparks which means affords ready connection with the original or standard devices for varying the timing of the spark obtained by the original type of ignition.

Still another object of the invention comprises the idea of a substantially unitary structure comprising an attaching or adapter bracket, an igniter mechanism, an ignition coil and the actuating means for varying the timing of the sparks.

Other objects will be in part obvious and in part pointed out hereinafter.

The invention accordingly consists of the various features of construction, combinations of elements and arrangements of parts exemplified by the construction hereinafter set forth and the scope of the application of which will be indicated in the following claims.

Figure 1:
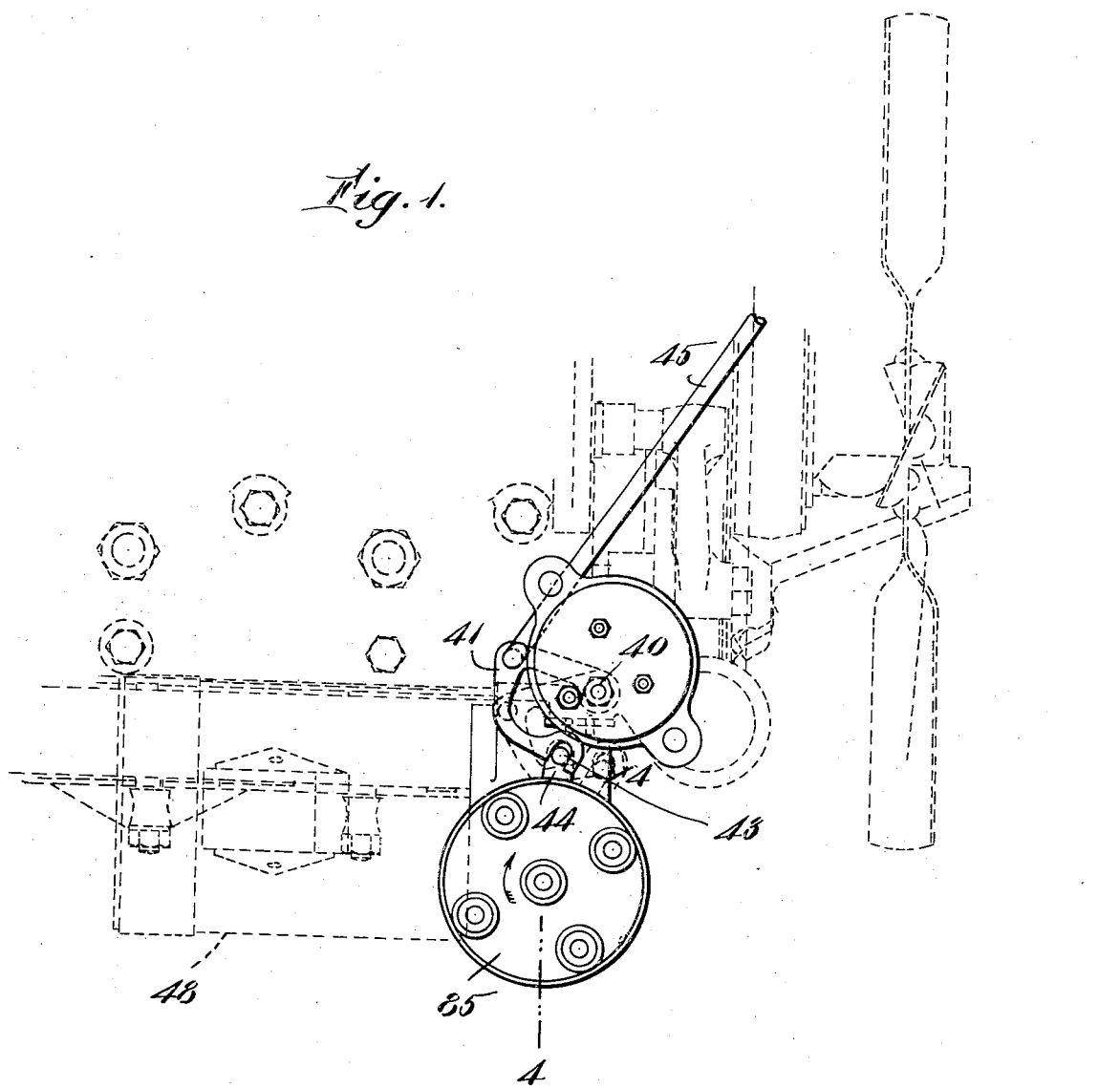
Figure 2:
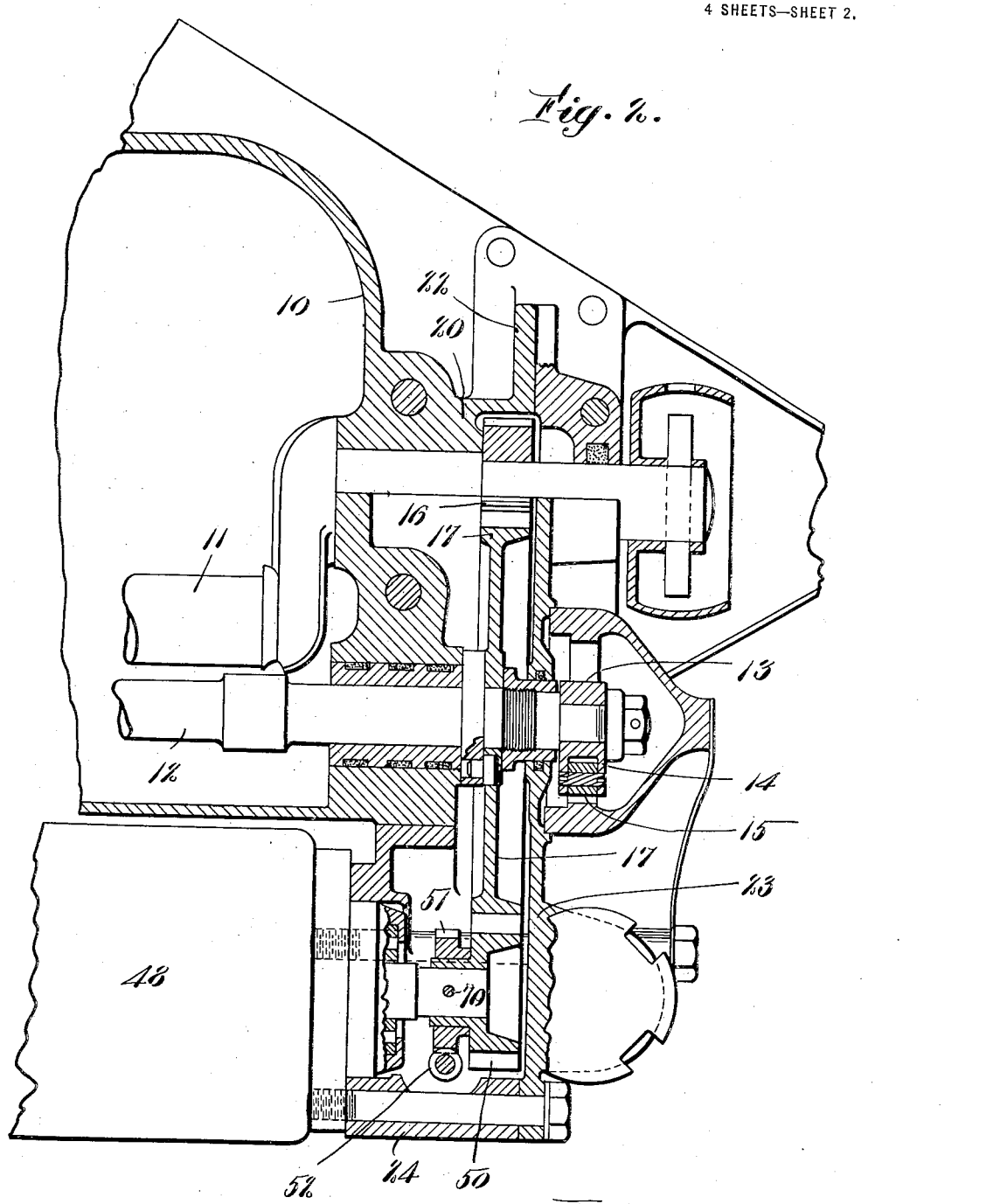
Figure 3:
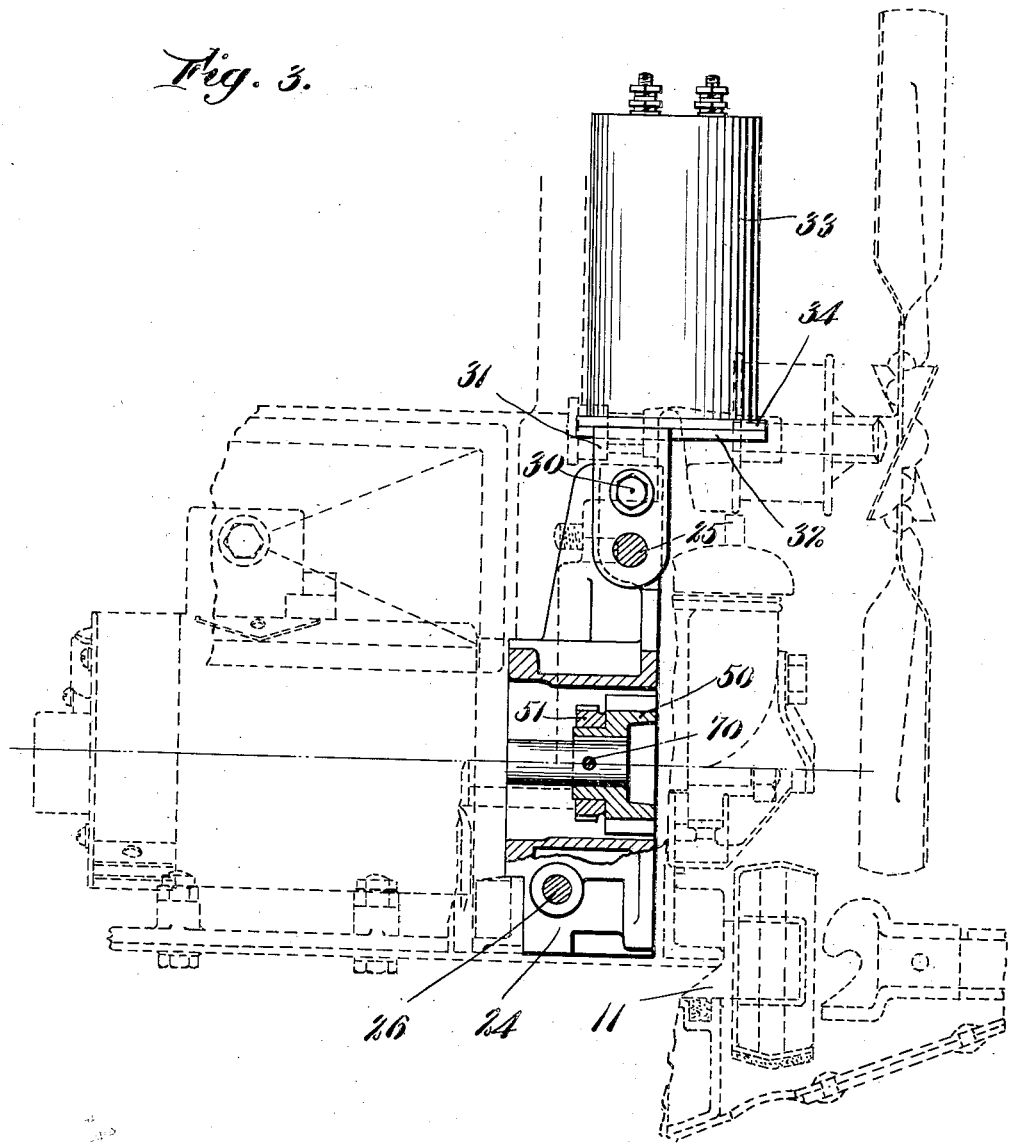
Figure 4:
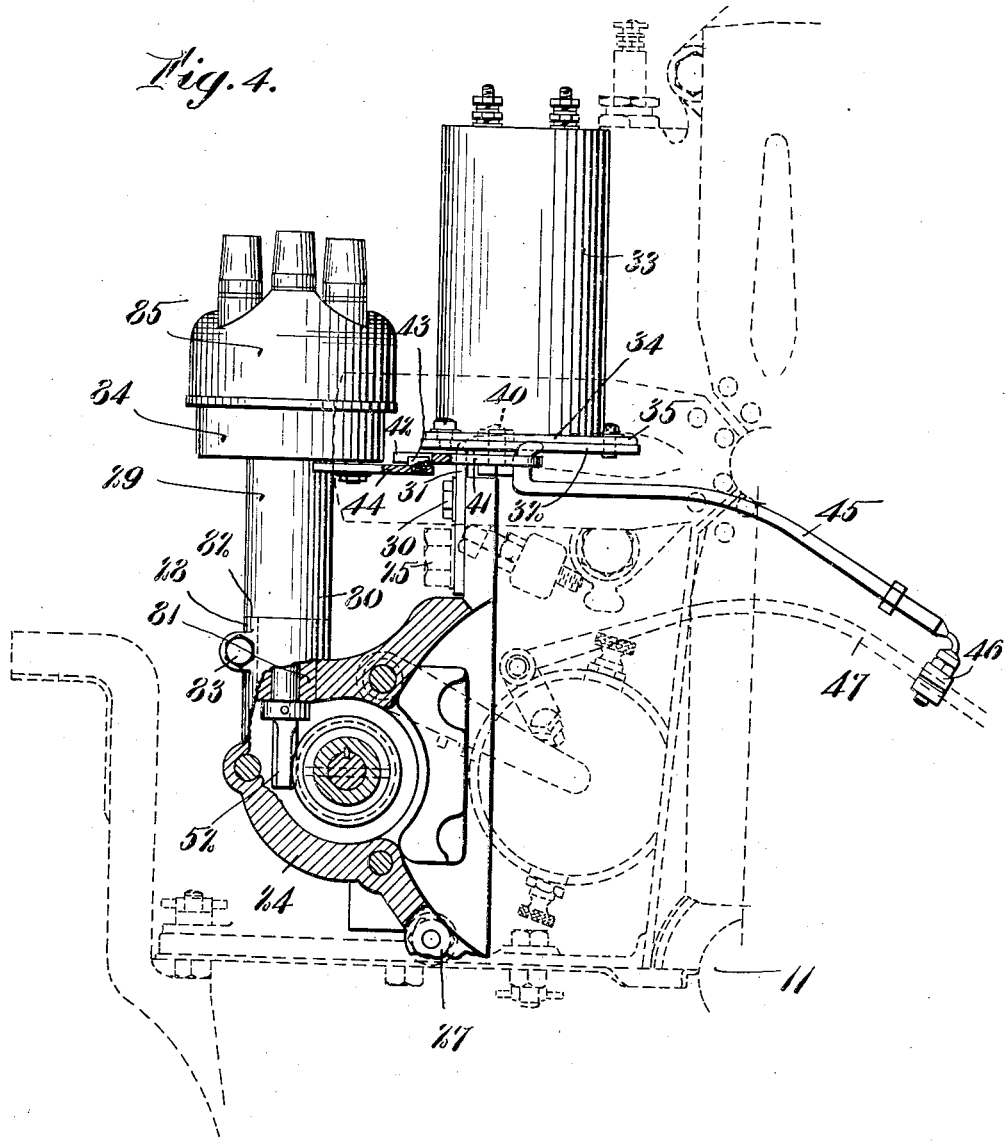

In the drawings wherein there is shown one of various possible embodiments of the invention, Figure 1 is a plan view of a portion of the forward end of a Ford car showing the present invention in full lines with the original or standard parts of the car dotted. The wiring is omitted for the sake of clearness. Fig. 2 is a view similar to Fig. 1 but partially in section and with other parts broken away to show more clearly the interior construction. Fig. 3 is a view in side elevation showing the standard parts of the engine and standard electrical equipment in dotted lines. The adapter bracket and its appurtenances are shown in full lines and the adapter bracket is sectioned to show more clearly the interior construction, the section line being taken along the lines of the axis of the generator armature shaft. Fig. 4 is a view of Fig. 1 in front elevation, the adapter bracket being broken away, however, substantially along the line 4—4 of Fig. 1 to show the driving connections as they are housed by the correlation of the adapter bracket, the engine and the timing gear housing cover plate.

Referring now more particularly to the drawings, there is indicated at 10 the main casting of an internal combustion engine. The engine cylinders are provided in this casting and it serves also to journal a crank-shaft 11 and an intermediate or cam shaft 12 which latter is often termed the "timer shaft." At the forward end of the latter shaft and positioned forwardly of the casing casting 10 is a commutator 13 of well-known construction and which serves as a part of the standard Ford ignition apparatus. This commutator comprises an arm 14 carrying a contact roller 15 and as the timer shaft is rotated from the cam shaft 11 through a gear 16 on the crank shaft meshing with a gear 17 on the time shaft, contact is periodically made every 90 degrees of rotation of the contact 15. The engine casing casting 10 is provided with an offset portion 20 which serves in part as a housing for the so-called timing gears 16 and 17. This housing is supplemented by a cover plate secured by means of bolts passing into a flange 22 of the housing and when so supplemented an oil tight casing is formed for the protection of the timing gears. Formerly it was the sole function of the cover-plate to house the timing gears but later the cover plate was extended as indicated in Fig. 2 by the extension 23 to provide a wing or laterally extending bracket from which parts of the electrical system might be supported.

The forward end of the engine casing is open to permit the projection therethrough of the timing gear 17. A bracket or intermediate member has been used as standard construction to fit against the engine adjacent the point of opening and this bracket member has been secured to the engine by means of bolts respectively above and below the projecting timing gear 17 and by means of a third bolt projecting rearwardly into the bracket member from the timing gear housing cover plate. Also according to standard construction a generator unit has been mounted rearwardly of the bracket member and secured thereto by means of bolts passed through the cover plate extension, through the bracket member, and into the end cap of the generator. It is an important feature of the invention to provide a bracket or intermediate member corresponding to a degree with the standard bracket just referred to. In the preferred form of the present invention the points of attachment correspond with the points of attachment of the standard bracket. In the present case, the bracket or intermediate member is shown at 24 having provision at 25, 26 and 27 for attachment by means of bolts similar to the attaching bolts previously referred to if not by the identical bolts. The bracket or intermediate member 24 is otherwise constructed and shaped to be interchangeable with the standard bracket but it is further equipped with a split and bored boss 28 which is adapted to receive a vertical type igniter 29. At the top of the bracket 24 there is attached by means of bolt 25 and an additional bolt 30 an angle member 31 forming a substantially horizontal table 32 to which an ignition coil 33 of usual type may be secured. The ignition coil 33 is provided with a metal base 34 having diametrically opposed lugs or projections 35 by which it may be secured to the table 32. Below the table and secured for pivotal movement by means of a stud screw 40 there is a lever 41 having the peculiar configuration shown clearly in Fig. 1 and provided at its outermost extremity with an open-ended slot 42. Confined between the walls of the slot 42 there is a pin 43 extending upwardly from an operating arm 44, the latter connecting through a slot in the casing of the igniter 29 with the contact set of the interrupter mechanism of the igniter. A connecting rod 45 has one end connected with the lever 41 substantially midway of the extremities of the latter as shown clearly in Fig. 1. The other end of the connecting rod is provided with a clamping device 46 whereby it may be secured to the standard operating rod 47 which connects in turn with the contact arm 14 of the standard commutator mechanism.

The generator of the electrical system has its armature shaft extended to terminate within the housing provided by the association of the intermediate or bracket member, the engine casing and the timing gear housing cover plate. A small gear 50 is fixed upon the armature shaft extension and meshes with the timing gear 17 forming a driving connection between the timing shaft and the armature shaft. A spiral gear 51 is also fixed to the armature shaft extension and meshes with a spiral gear 52 formed on the lower end of the vertical actuating or operating shaft of the igniter 29.

It will be apparent that by the present invention an operator of an engine of the type shown, desiring the conveniences of battery ignition, may obtain them at small cost with a minimum amount of difficulty in installation and without the necessity of employing skilled labor. In changing over the standard system to adapt it for use with the battery as a source of ignition, the bolts holding the bracket or intermediate member to the engine and the generator and bracket to the coverplate extension are removed. The generator is laid to one side while a new bracket with its appurtenances, the igniter coil and connecting rod, is secured in position. The standard gear on the armature shaft extension may then be discarded and a new combination of gears applied, as shown clearly in Fig. 3, the spur gear 50 and the spiral gear 51, the spur gear being splined on the armature shaft and a pin 70 being passed through both gears and the shaft.

The igniter 29 comprises a casing 80 having a lower portion 81 of reduced diameter forming a shoulder 82. In assembling the apparatus, the reduced portion 81 of the casing is inserted within the split bored boss 28 and the latter is then tightened by means of bolt 83 to hold the casing securely in position. The upper portion 84 of the casing is of enlarged diameter and cup shaped to receive any usual or suitable type of interrupter mechanism. Above the portion 84 is the distributer head 85 carrying the secondary terminals and contacts, and the vertical operating shaft which carries the spiral gear 52 at its lower extremity extends upwardly through the casing carrying cams to actuate the interrupter mechanism and a movable contact which coöperates with the contacts of the secondary terminals.

As many changes might be made in the above construction, and as many apparently widely different embodiments of the invention might be made without departing from the scope thereof, it is intended that all matter set forth in the foregoing description, or shown in the accompanying drawings, shall be interpreted as illustrative, and not in a limiting sense.

What I claim is:

1. Devices for providing battery ignition for an engine which has a laterally extending supporting plate, a bracket rearwardly of said plate and secured to the side of the engine, a generator secured rearwardly of said bracket; said devices comprising a bracket substitutable for the first said bracket and having provision for accommodating a timer shaft, and means for connecting the substituted bracket to a rear face of said supporting plate and for connecting an end of the generator to a rear face of said substituted bracket.

2. Devices for providing battery ignition for an engine which has a laterally extending supporting plate, a bracket rearwardly of said plate and secured to the side of the engine, and a generator secured rearwardly of said bracket; said devices comprising, in combination, a bracket substitutable for the first said bracket and having provision for accommodating a timer shaft, timer-distributer means mounted on the second said bracket, a coil supported by the second said bracket, and means for operating the timing means to vary the time of actuation.

3. Devices for providing battery ignition for an engine which has a laterally extending supporting plate, a bracket rearwardly of said plate and secured to the side of the engine, and a generator secured rearwardly of said bracket; said devices comprising a bracket substitutable for the first said bracket and having provision for accommodating a timer shaft, the second said bracket having means registering with the supporting means of said plate and the securing means of said generator whereby original points of attachment are maintained although with the second said bracket in place of the first.

4. Devices for providing battery ignition for an engine which has a laterally extending supporting plate, a bracket rearwardly of said plate and secured to the side of the engine, and a generator secured rearwardly of said bracket; said devices comprising a bracket substitutable for the first said bracket and having provision for accommodating a timer shaft, the second said bracket adapted to serve as a coupling member between said plate and said generator and having points for attachment to the plate, generator and engine which correspond to those of the first said bracket.

5. Battery ignition apparatus for use with an engine having commutator mechanism at its forward end, an operating rod coöperatively associated with the commutator mechanism whereby its timing may be varied, a generator driven from said engine, and means for supporting said generator in fixed relation to said engine; said apparatus comprising, in combination, a bracket apertured to receive a portion of the generator rotor-shaft and a transmission element, said bracket also having provision for supporting timer-distributer mechanism and an ignition coil; timer-distributer mechanism comprising an actuating shaft journaled in said bracket; and controlling means for varying the timing of the timer mechanism including a connection secured to the said operating rod of the commutator mechanism.

6. In a device of the character described, in combination, a bracket having provision for receiving an igniter, means providing for the attachment of said bracket to a side wall of an engine, means providing for the attachment of a generator to said bracket, a coil supported from said bracket, and an igniter having an operating shaft extending into said bracket, said bracket being interiorly recessed to receive and house a transmission connection between the operating shaft of the igniter and the armature shaft of the generator.

7. In a device of the character described, in combination, a bracket having substantially parallel attaching side walls, means for attaching said bracket to a side wall of an engine, a coil mounted on said bracket, an igniter mounted on said bracket, and actuating means for the interrupter mechanism of said igniter whereby the timing may be varied, said bracket being interiorly recessed to receive a generator armature shaft extension and an igniter operating shaft extension and their transmission connections.

8. In a device of the character described, a unitary structure comprising, in combination, an attaching and supporting bracket, a table on said bracket, a coil mounted on the table, an igniter having an operating shaft rotatively mounted in said bracket, means movably fixed to said table for transmitting movement to a part of said igniter, and an operating member extending from said last said means adapted to connect with the commutator varying means of an engine.

9. In a device of the character described, a unitary structure comprising in combination, an attaching and supporting bracket, a table on said bracket, a coil mounted on the table, an igniter having an operating shaft rotatively mounted in said bracket, means movably fixed to said table for transmitting movement to a part of said igniter, and an operating member extending from said last said means adapted to connect with the commutator varying means of an engine; said bracket being recessed to receive a generator shaft extension, an extension of the operating shaft of said igniter and transmission connections between the two.

10. In a device of the character described, in combination, a bracket having two substantially parallel attaching faces for attachment to a side wall of an engine and a third attaching face at substantially a right angle thereto, the bracket being recessed from said third face and adapted for attachment to an engine so that the recess will register with an opening in said engine, an igniter having a rotatable operating shaft extending into said bracket, said bracket being further recessed to accommodate an armature shaft extension of a generator and transmission devices between the armature shaft and said igniter operating shaft.

11. A bracket for adapting an engine to battery ignition, said bracket having points of attachment for securing it to a side wall of the engine and for securing a generator to the bracket, which points correspond to those of a bracket for which it is to be substituted, said bracket being characterized by the provision of means for supporting an igniter and receiving an extension of the operating shaft thereof.

12. In a device of the character described in combination, a detachable coupling member secured in position against the side of an engine and having a recess registering with an opening in said engine to accommodate a transmission device, means for securing a generator endwise to a rear face of said member, a timer distributer having an operating shaft rotatably mounted in said member, and means for drivingly connecting said timer distributer with said transmission device.

13. In a device of the character described in combination, an end plate fastened to an end of an engine, a coupling bracket having means for attaching said bracket to said plate and to a side wall of said engine and having a recess adapted to register with an opening in said plate, transmission devices from the engine crank shaft extending into said recess, a generator secured to a face of said bracket having an armature shaft extending through said face, a battery ignition device operatively supported by said bracket and driving connections within the bracket whereby the generator armature and the ignition device are drivingly connected with the said transmission devices.

WILLIAM B. MOSES.